United States Patent
Reijonen et al.

(10) Patent No.: US 9,155,185 B2
(45) Date of Patent: Oct. 6, 2015

(54) ELECTRODE CONFIGURATION FOR DOWNHOLE NUCLEAR RADIATION GENERATOR

(75) Inventors: Jani Reijonen, Princeton, NJ (US);
Luke T. Perkins, Plainsboro, NJ (US);
Frederic Gicquiel, Pennington, NJ (US);
Christian Stoller, Princeton Junction, NJ (US); Peter Wraight, Skillman, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 369 days.

(21) Appl. No.: 12/618,821

(22) Filed: Nov. 16, 2009

(65) Prior Publication Data

US 2011/0114830 A1 May 19, 2011

(51) Int. Cl.
| | |
|---|---|
| *G21G 1/10* | (2006.01) |
| *H05H 5/02* | (2006.01) |
| *G01V 5/10* | (2006.01) |
| *H05H 7/22* | (2006.01) |
| *H05H 3/06* | (2006.01) |
| *H01J 35/04* | (2006.01) |
| *H01J 35/16* | (2006.01) |
| *G21B 1/00* | (2006.01) |

(52) U.S. Cl.
CPC *H05H 3/06* (2013.01); *H01J 35/04* (2013.01); *H01J 35/16* (2013.01); *G01V 5/10* (2013.01); *G21G 1/10* (2013.01); *H01J 2235/02* (2013.01); *H01J 2235/06* (2013.01); *H01J 2235/086* (2013.01); *H01J 2235/165* (2013.01); *H01J 2235/20* (2013.01)

(58) Field of Classification Search
CPC ............. G21G 1/10; G01V 5/10; G01V 5/12; G01V 5/14; H05H 5/02; H05H 7/22
See application file for complete search history.

(56) References Cited

U.S. PATENT DOCUMENTS

| | | | | |
|---|---|---|---|---|
| 3,664,960 | A | * | 5/1972 | Wood ........................ 250/423 R |
| 4,721,853 | A | | 1/1988 | Wraight |
| 4,760,252 | A | | 7/1988 | Albats et al. |
| 4,782,304 | A | * | 11/1988 | Aitken .......................... 315/506 |
| 4,810,876 | A | | 3/1989 | Wraight et al. |
| 4,856,585 | A | | 8/1989 | White et al. |

(Continued)

FOREIGN PATENT DOCUMENTS

SU            528834 A1     4/1980

OTHER PUBLICATIONS

Feld, "The Linear Electron Accelerator as a Pulsed neutron Source", Nucleonics 9(4), pp. 51-57 (1951).*

(Continued)

*Primary Examiner* — Jack W Keith
*Assistant Examiner* — Daniel Wasil
(74) *Attorney, Agent, or Firm* — Michael Dae

(57) ABSTRACT

Systems, methods, and devices with improved electrode configuration for downhole nuclear radiation generators are provided. For example, one embodiment of a nuclear radiation generator capable of downhole operation may include a charged particle source, a target material, and an acceleration column between the charged particle source and the target material. The acceleration column may include several electrodes shaped such that substantially no electrode material from the electrodes is sputtered onto an insulator surface of the acceleration column during normal downhole operation.

22 Claims, 13 Drawing Sheets

(56) References Cited

U.S. PATENT DOCUMENTS

| | | |
|---|---|---|
| 5,235,185 A | 8/1993 | Albats et al. |
| 5,293,410 A | 3/1994 | Chen et al. |
| 5,306,911 A | 4/1994 | Hunt |
| 5,680,431 A | 10/1997 | Pietras, III et al. |
| 6,124,834 A | 9/2000 | Leung et al. |
| 6,297,507 B1 | 10/2001 | Chen et al. |
| 6,688,390 B2 | 2/2004 | Bolze et al. |
| 6,754,586 B1 | 6/2004 | Adolph et al. |
| 6,768,120 B2 | 7/2004 | Leung et al. |
| 6,922,019 B2 | 7/2005 | Leung et al. |
| 6,974,950 B2 | 12/2005 | Leung et al. |
| 7,342,988 B2 | 3/2008 | Leung et al. |
| 7,366,615 B2 | 4/2008 | Herron et al. |
| 7,367,394 B2 | 5/2008 | Villareal et al. |
| 7,949,099 B2 | 5/2011 | Klinkowstein et al. |
| 8,056,625 B2 | 11/2011 | Villareal et al. |
| 8,118,097 B2 | 2/2012 | Villareal et al. |
| 8,336,622 B2 | 12/2012 | Villareal et al. |
| 2002/0150193 A1 | 10/2002 | Leung et al. |
| 2007/0237281 A1 | 10/2007 | Yakovlyev |
| 2008/0080659 A1 | 4/2008 | Leung et al. |
| 2009/0108192 A1 | 4/2009 | Groves |
| 2009/0135982 A1* | 5/2009 | Groves ............ 376/113 |
| 2010/0025573 A1 | 2/2010 | Hahto et al. |
| 2011/0044418 A1* | 2/2011 | Stubbers et al. ............ 376/116 |
| 2011/0114830 A1 | 5/2011 | Reijonen et al. |

OTHER PUBLICATIONS

Oxford Dictionary, U.S. English, definition of "several" (from http://www.oxforddictionaries.com/us/definition/american_english), Oxford University Press (2013).*

WO 2008/112034 A2 (Regents of the University of California) Sep. 18, 2008.*

P. Roychoudhary et al., "Technology of High Current Ion Bean Sources: A Barc Scenario," BARC Newsletter, No. 259, (Aug. 2005).

International Search Report and the Written Opinion for International Application No. PCT/US2010/056566 dated Jul. 29, 2011.

International Search Report and the Written Opinion for International Application No. PCT/US2012/054582 dated Jan. 11, 2013.

* cited by examiner

US 9,155,185 B2

ELECTRODE CONFIGURATION FOR DOWNHOLE NUCLEAR RADIATION GENERATOR

BACKGROUND

The present disclosure relates generally to downhole radiation generation for nuclear well logging and, more particularly, to electrode configurations for downhole nuclear radiation generator tubes.

A downhole generator tube may include three main components: an ion source, an acceleration column, and a target. An ion beam from the ion source may advance through the acceleration column toward the target, guided by a potential difference between an electrode near the ion source and an electrode near the target. Neutrons and/or gamma-rays are generated when the accelerated ions strike the target. As the ion beam progresses through the acceleration column, however, some of the ions may strike an electrode instead of the target. This may occur in part because the acceleration column of a downhole neutron generator tube may hold a pressurized gas, rather than a vacuum, and ions from the ion beam may strike pressurized gas particles in the acceleration column and change direction.

When an ion from the ion beam impinges on an electrode in the acceleration column, ion-induced sputtering may result. Sputtering causes the emission and transport of electrode material, which generally may be isotropic and generally may travel in a straight line from the point of emission. As a result, electrically conductive electrode material may condense on nearby ceramic high voltage insulators that surround the acceleration column. If the high voltage insulators are coated by sputtered electrode material across a substantial length of the acceleration column, the voltage potential between the electrode near the ion source and the electrode near the target may short circuit in a catastrophic leakage event. Even if the acceleration column does not short circuit, sputtered electrode material along the high voltage insulator may form a conductive deposited film that takes on an intermediate voltage between the potential of the ion source and the potential of the target. This conductive film may increase electric field stresses on the adjacent electrodes in the acceleration column. Increased electrical field stresses may yield an increase in a high voltage leakage current, as well as increase the likelihood of catastrophic leakage events due to leakage currents on the insulator or field emission from one of the electrodes.

Uneven target surface wear may also be problematic for a downhole neutron generator. Because the ion beam from the ion source to the target may be center-weighted, the ion beam may be unevenly distributed across the beam spot upon striking the target. This uneven distribution may generate uneven wear on the end of the target, which may cause the neutron yield of the neutron generator to diminish as part of the target wears out prematurely.

Similarly, a downhole x-ray generator tube also may include three main components: an electron emitter (cathode), an acceleration column, and a target (anode). An electron beam from the cathode may advance through the acceleration column toward the anode, guided by the potential difference between an electrode near the electron gun (cathode) and the anode or an adjacent electrode. X-rays are generated through Bremsstrahlung or characteristic x-ray emission following inner shell ionization when the electrons hit the anode and are decelerated and scattered in the material. As the electron beam progresses through the acceleration column, however, some of the electrons may strike an electrode instead of reaching the anode. For this reason and others, many of the same problems mentioned above may affect downhole neutron generator tubes as well as x-ray generator tubes.

SUMMARY

Certain aspects commensurate in scope with the originally claimed embodiments are set forth below. It should be understood that these aspects are presented merely to provide the reader with a brief summary of certain forms the disclosed embodiments might take and that these aspects are not intended to limit the scope of the disclosed subject matter. Indeed, embodiments of the disclosed subject matter may encompass a variety of aspects that may not be set forth below.

Presently disclosed embodiments relate to devices and methods associated with improved electrode configurations for downhole nuclear radiation generators. In one example, an embodiment of a nuclear radiation generator capable of downhole operation may include a charged particle source, a target material, and an acceleration column between the charged particle source and the target material. The acceleration column may include several electrodes shaped such that substantially no electrode material from the electrodes is sputtered onto an insulator surface of the acceleration column during normal downhole operation.

In another example, an embodiment of a neutron generator tube capable of downhole operation may include an ion source, a target electrode, and an acceleration column disposed between the ion source and the target electrode. The acceleration column may include an extractor electrode nearer to the ion source than the target electrode, a suppressor electrode nearer to the target electrode than the ion source, and an intermediate electrode disposed between the extractor electrode and the suppressor electrode.

In a further example, an embodiment of an x-ray generator capable of downhole operation may include a cathode, an anode, and an acceleration column between the cathode and the anode. The acceleration column may include several electrodes shaped such that substantially no electrode material from the electrodes is sputtered onto an insulator surface of the acceleration column during normal downhole operation.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosure herein generally describes various electrode configurations for an acceleration column of a downhole nuclear radiation generator, such as a neutron generator tube or an x-ray generator tube. While the present disclosure primarily describes such configurations in the context of a neutron generator tube, the disclosed electrode configurations and techniques regarding their use may equally apply to a downhole x-ray generator tube. Specifically, the ion source and target electrode of a neutron generator tube may be respectively analogous to the cathode and anode of a downhole x-ray generator tube. As such, the acceleration column of a downhole x-ray generator tube may similarly employ the electrode configurations and techniques described with reference to a neutron generator tube. When such electrode configurations and techniques are employed in a downhole x-ray generator tube, an electron beam from the cathode may be less likely to impinge on any of the intermediate electrodes while traveling toward the anode, which could cause parasitic x-rays and/or secondary electron emission. A general description of such an x-ray tube may be found in U.S. Pat. No. 5,680,431, "X-RAY GENERATOR," assigned to Schlumberger Technology Corporation, which is incorporated herein by reference in its entirety.

Accordingly, the electrode configurations and associated techniques disclosed herein may apply to any downhole nuclear radiation generator that may generate nuclear radiation by accelerating charged particles through an acceleration column toward a target material. Such a downhole nuclear radiation generator may include a charged particle source (e.g., an ion source and/or a cathode) to emit charged particles (e.g., ions and/or electrons) toward a target material (e.g., a target electrode and/or an anode) that may produce nuclear radiation (e.g., neutrons and/or x-rays) when struck by the charged particles.

Figure 1:
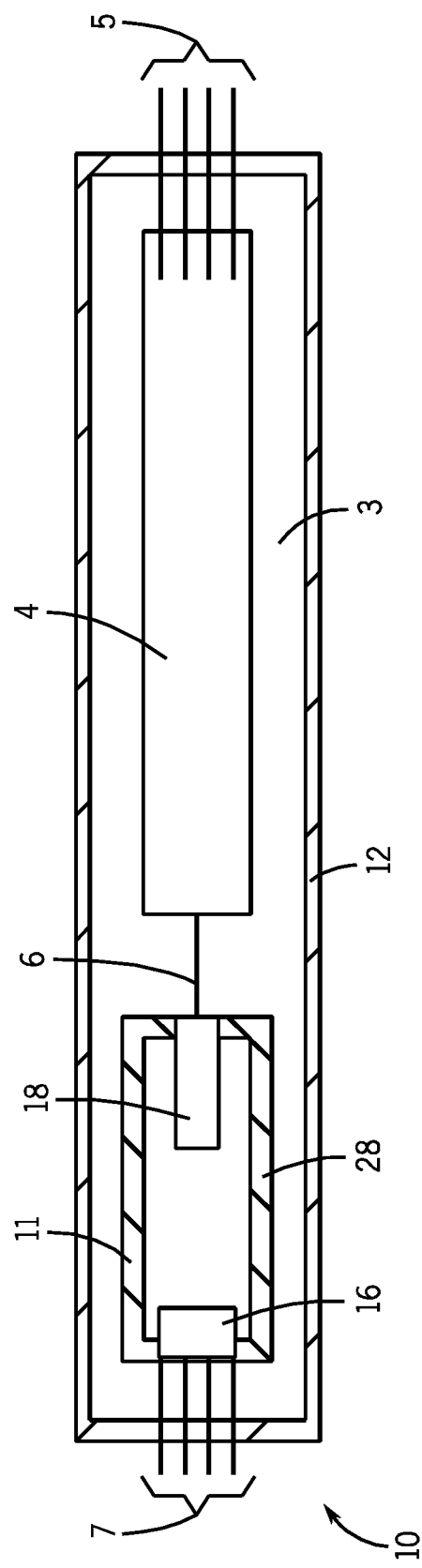
FIG. 1 is a schematic block diagram of a neutron generator, in accordance with an embodiment.

With the foregoing in mind, FIG. 1 represents a schematic cross-sectional view of a neutron generator 10 suitable for use in a downhole tool. The neutron generator 10 may include a pressure housing 12 having a pressurized insulating gas 3 and various device components. For example, the neutron generator 10 may include a high voltage supply 4 controlled externally via external power and control feedthroughs 5. This high voltage supply 4 may deliver high voltages in the range from 50 kV to 150 kV or more via a negative high voltage line 6 to a target electrode 18 in an evacuated neutron generator tube 11. Neutron generator tube 11 may also include an ion source 16 within a vacuum envelope controlled by external power and control feedthroughs 7. The vacuum envelope may include a high voltage insulator 28 separating various electrodes (shown in FIG. 3 and described below) located between the ion source 16 and the target electrode 18. The ions generated in the ion source 16 may be accelerated to the target electrode 18, and a nuclear reaction between the incoming ions and nuclei located in the target electrode 18 may generate neutrons. The neutrons may be generated with the reaction of deuterons with tritium (i.e. the d-T reaction), which generates 14.1 MeV neutrons from d+T→n+alpha+ 17.6 MeV; where d is the nucleus of a $^2$H atom, T is a $^3$H atom and alpha is the nucleus of the $^4$He atom.

The target electrode 18 of the neutron generator tube may be a disk of titanium saturated with $^3$H. The ion source 16 may ionize deuterium $^2$H$_2$ gas, and the resulting molecular ions or bare nuclei may be accelerated to the target electrode 18 by an electric field between the ion source 16 and the target electrode 18. The ion beam may be pulsed to obtain bursts of neutrons. Continuous operation also may be possible.

The neutron generator tube 11 and the high voltage source 4 may be enclosed in the pressure housing 12 containing the insulating gas 3, as well as insulating sleeves (not shown) to allow the generation and application of the required high voltage in the limited available space. The insulating gas 3 may include SF$_6$ at pressures ranging from a few psig to more than 100 psig. The feedthroughs 5 and 7 into the pressure housing 12 may provide the power to the high voltage sections of the neutron generator 11 and monitoring outputs for external controls. Similarly, power may be provided to the ion source 16, which may include control voltages and currents to regulate and/or pulse the ion beam current.

Figure 2:
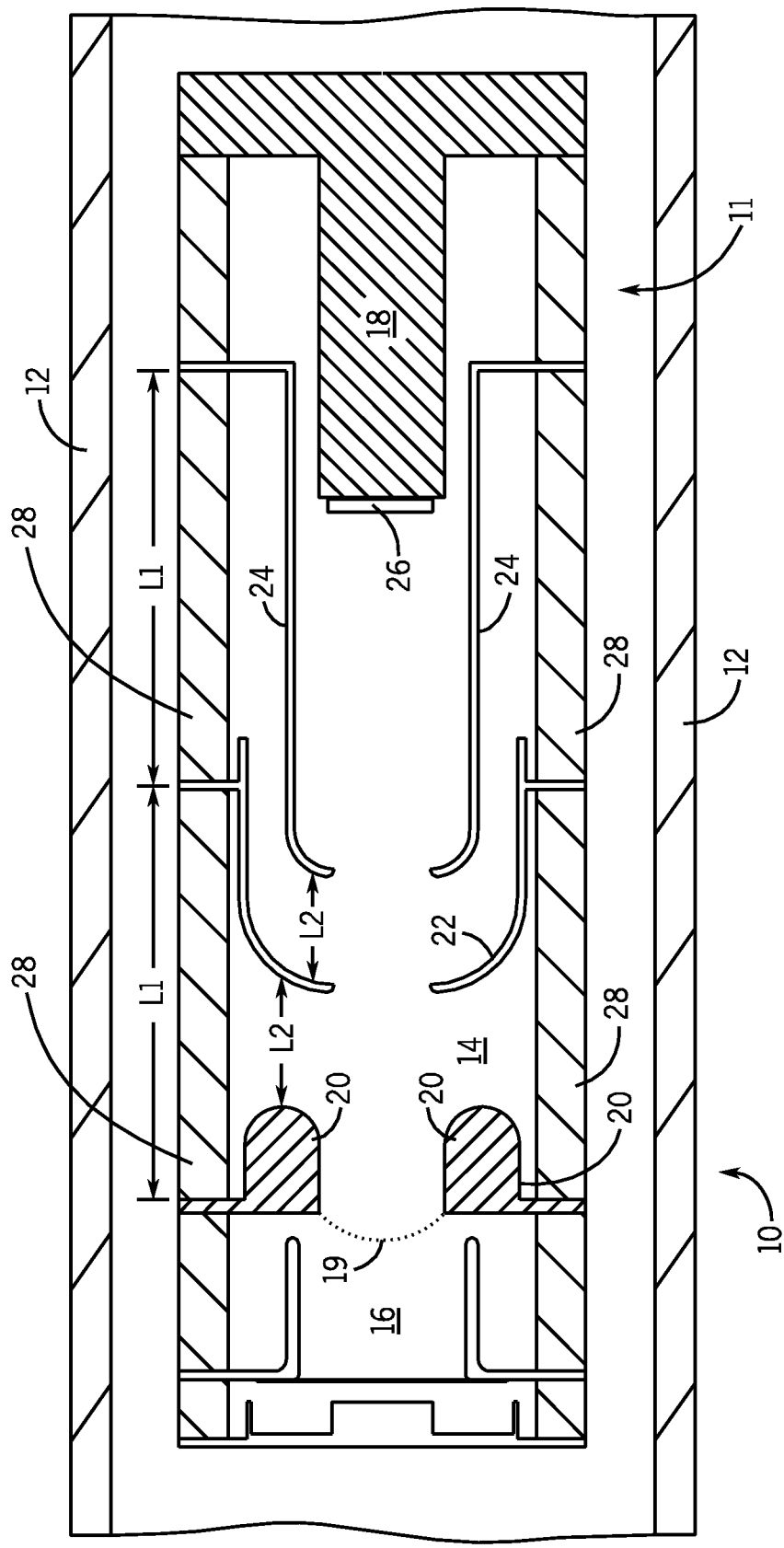
FIG. 2 is a schematic cross-sectional view of a neutron generator tube having an electrode configuration including an intermediate electrode, in accordance with an embodiment.

FIG. 2 is a more detailed schematic cross-sectional view of the neutron generator 10 of FIG. 1, illustrating particularly an improved electrode configuration of the neutron generator tube 11. Located within the pressure housing 12, an acceleration column 14 may provide a path for an ion beam from the ion source 16 to travel toward the target electrode 18. The acceleration column 14 may generally remain at a low gas pressure, as generally required for the proper functioning of the ion source 16, rather than at a vacuum, because the neutron generator tube 10 is a tool for downhole use and the neutron generator tube 11 may be sealed. As such, differential pressure may not be maintained between the various sections of the neutron generator tube 11, as may be the case in a differentially pumped ion source used in many laboratory applications. The ion source 16 may generally produce a pulsed ion beam that may be rapidly turned on and off. Such an ion source 16 and other components of the neutron generator tube 10 may generally be described in U.S. Pat. No. 5,293,410, "NEUTRON GENERATOR TUBE," assigned to Schlumberger Technology Corporation, which is incorporated herein by reference in its entirety.

The ion beam from the ion source 16 may be guided through the acceleration column 14 by an extractor electrode 20, an intermediate electrode 22, and a suppressor electrode 24, before reaching a titanium coating 26 on the target 18. Though the titanium coating 26 is schematically illustrated as covering an entire end of the target 18, the titanium coating 26 may cover only a part of the end where the ion beam is expected to strike the target 18. When the ion beam from the ion source 16 hits the titanium coating 26, the target electrode 18 may generate neutrons in the manner discussed above. The extractor electrode 20, the intermediate electrode 22 and the suppressor electrode 24 may be electrically separated from one another by an insulator 28, which may be constructed of alumina (Aluminum oxide ceramic).

One or more high voltage power sources, such as the high voltage power source 4 illustrated in FIG. 1, may supply power to the electrodes 20, 22, and 24 at various potentials. In particular, the extractor electrode 20 may have a potential approximately 100 kV higher than that of the suppressor electrode 24 (i.e. the suppressor electrode 24 may have a negative potential with respect to the extractor electrode 20). The target electrode 18 may have a nominally higher voltage than the suppressor electrode 24 of approximately 200 V to 1000 V or more to suppress the backstreaming of secondary electrons generated in the target by the impinging ion beam. The intermediate electrode 22 may have an approximately median voltage potential between the voltage potentials of the extractor electrode 20 and of the suppressor electrode 24. For example, if the extractor electrode 20 has a potential of 100 kV, and the suppressor electrode 24 has a potential of 0 V, the intermediate electrode 22 may have a potential of approximately 50 kV. In alternative embodiments, the intermediate electrode 22 may have any suitable intermediate potential. By distributing the potentials across the electrodes 20, 22, and 24 in this way, the electrical fields produced by the electric potentials applied to the electrodes may be relatively evenly distributed across the acceleration column 14, as described in greater detail below with reference to FIG. 3. When the presently illustrated electrode configuration is employed in the acceleration column of an x-ray generator tube, the applied voltage potentials may be substantially the same.

The extractor electrode 20, the intermediate electrode 22, and the suppressor electrode 24 may be shaped to reduce sputtering events that may occur when the neutron generator tube 10 is operating. For example, the extractor electrode 20 may have a rounded shape extending into the acceleration column 14, which may guide the ion beam from the ion source 16 to the target 18 without striking the intermediate electrode 22 or the suppressor electrode 24 during normal operation. As noted above, the interception of the ion beam from the ion source 16 by the intermediate electrode 22 or the suppressor electrode 24 may cause electrode material to wear away, sputtering out into the acceleration column 14. The shape of the extractor electrode 20 may thus reduce the likelihood of harmful sputtering of electrode material.

The configuration of the intermediate electrode 22 may further reduce the likelihood that the insulator 28 be coated by electrode material due to sputtering events. Indeed, the very presence of the intermediate electrode 22 in the acceleration column 14 may serve to shadow, or shield, the ceramic insulator 28 from conductive material that may sputter off of the suppressor electrode 24. Any material sputtered off of the suppressor electrode 24 may be deposited on the intermediate electrode 22 instead of the ceramic insulator 28. The same considerations may apply to any other electrodes that protect the ceramic insulator 28 from being coated by sputter deposits.

The intermediate electrode 22 also may be shaped so as to increase the likelihood that sputtered electrode material from the suppressor electrode 24 is deposited on the intermediate electrode 22 rather than the ceramic insulator 28. For example, the intermediate electrode 22 may be inserted between the ceramic insulators 28 approximately midway between the extractor electrode 20 and the suppressor electrode 24, at an approximate length $L_1$ from both. Extending from the insulator 28 into the acceleration column 14, the end of the intermediate electrode 22 may reach approximately half way between the ends of the extractor electrode 20 and the suppressor electrode 24, at an approximate length $L_2$ from both. The intermediate electrode is disposed in the high voltage insulator farther from the ion source than an end of the suppressor electrode that is not disposed in the high voltage insulator.

The shaping of the intermediate electrode 22, in addition to shadowing the ceramic insulator 28 from sputtering events, may also reduce electron leakage and/or catastrophic leakage events in the acceleration column 14. Due to the shape of the intermediate electrode 22, the electrical field between the extractor electrode 20 and the suppressor electrode 24 may be controlled through the acceleration column 14 in a manner that may reduce electrical field stresses on the extractor electrode 20, the intermediate electrode 22, and/or the suppressor electrode 24 as well as on the insulators 28 separating the electrodes. With reduced and/or more predictable electrical field stresses on the electrodes 20, 22, and/or 24, the likelihood of spontaneous electron emission and/or catastrophic leakage events may be correspondingly reduced.

The suppressor electrode 24 may also be shaped so as to reduce the likelihood of sputtering events. Specifically, the end of the suppressor electrode 24 may extend inside the acceleration column 14 to beyond the location of the start of the intermediate electrode 22. This arrangement may reduce the likelihood that any electrode material that sputters from the surface of the suppressor electrode 24 reaches the insulator 28. Because the end of the suppressor electrode 24 extends beyond the start of the intermediate electrode 22, any electrode material sputtered off of the suppressor electrode 24 is more likely to be shielded by the intermediate electrode 22 than deposited on the ceramic insulator 28. It should be noted that, independent of the shape of the intermediate electrode 22, imposing a defined potential at an intermediate position between the suppressor electrode 24 and the extractor electrode 20 may improve the stability and/or the longevity of the neutron generator tube 11, even in the presence of some sputtered material deposited onto the ceramic insulator 28.

Figure 3:
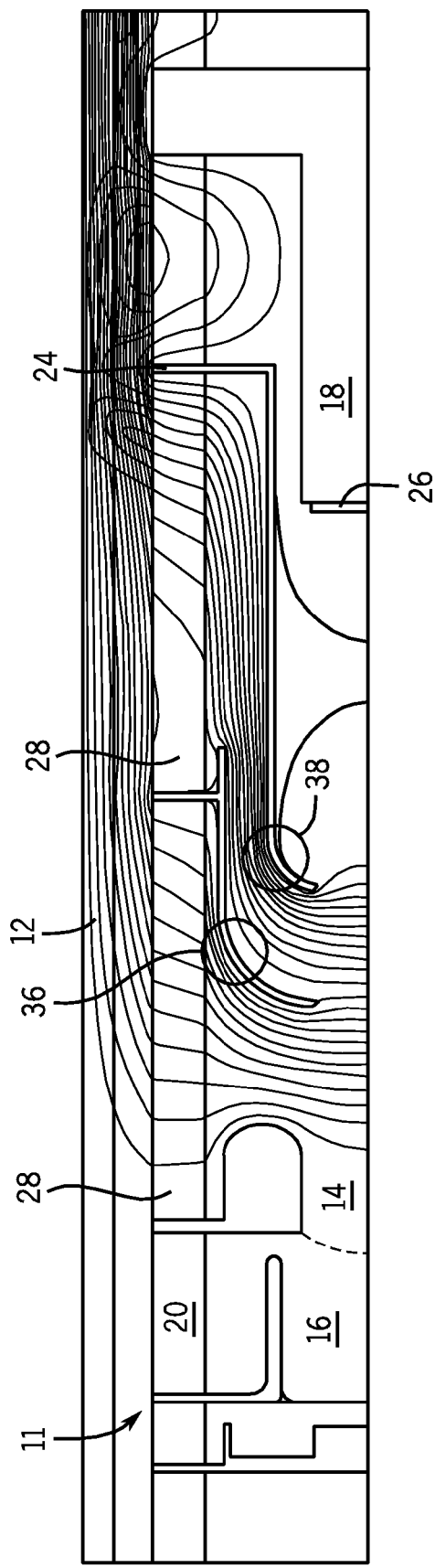
FIG. 3 is a schematic cross-sectional view of the electric potential distribution in the upper half of the axial neutron generator tube of FIG. 2, in accordance with an embodiment.

FIG. 3 illustrates a schematic cross-sectional view of the electric field distribution in the top half of the neutron generator tube 11. Because of the axial symmetry of the generator tube 11, only half of the tube is outlined. As shown in FIG. 3, an ion beam (not shown) from the ion source 16 may be guided by an electric field 34 that is approximately evenly distributed along the length between the end of the extractor electrode 20 and the end of the suppressor electrode 24. Because the intermediate electrode 22 may have an approximately median voltage potential between the voltage potentials of the extractor electrode 20 and of the suppressor electrode 24, and the intermediate electrode 22 may be located at an approximately median distance between the extractor electrode 20 and the suppressor electrode 24, the electric field 34 may be generally evenly distributed between all three electrodes 20, 22, and 24.

Though two primary electrical field stress points 36 and 38 may appear on the intermediate electrode 22 and the suppressor electrode 24, respectively, the electrical field stresses at the points 36 and 38 may be substantially lower than those found on electrodes of an acceleration column having only the extractor electrode 20 and the suppressor electrode 24 (i.e., lacking any intermediate electrodes 22). By way of example, the voltage potential of the extractor electrode 20 may be approximately 50 kV higher than the intermediate electrode 22 and may be approximately 100 kV higher than the suppressor electrode 24. The point 36 may have an electrical field stress of approximately 192 kV/cm, and the point 38 may have an electrical field stress of approximately 221 kV/cm. In contrast, in an acceleration column without an intermediate electrode, the electrical field stress on a suppressor electrode may reach 449 kV/cm when a layer of sputtered electrode material has been deposited on a surrounding ceramic insulator. Because the electrical field stresses at the points 36 and 38 are reduced, the likelihood of spontaneous electron emission from the electrodes and/or catastrophic leakage events may also be reduced. Additionally, adjusting the shape of the electrodes 22 and 24 through modeling and experimentation may further reduce the electrical field stresses on points 36 and 38.

Figure 4:
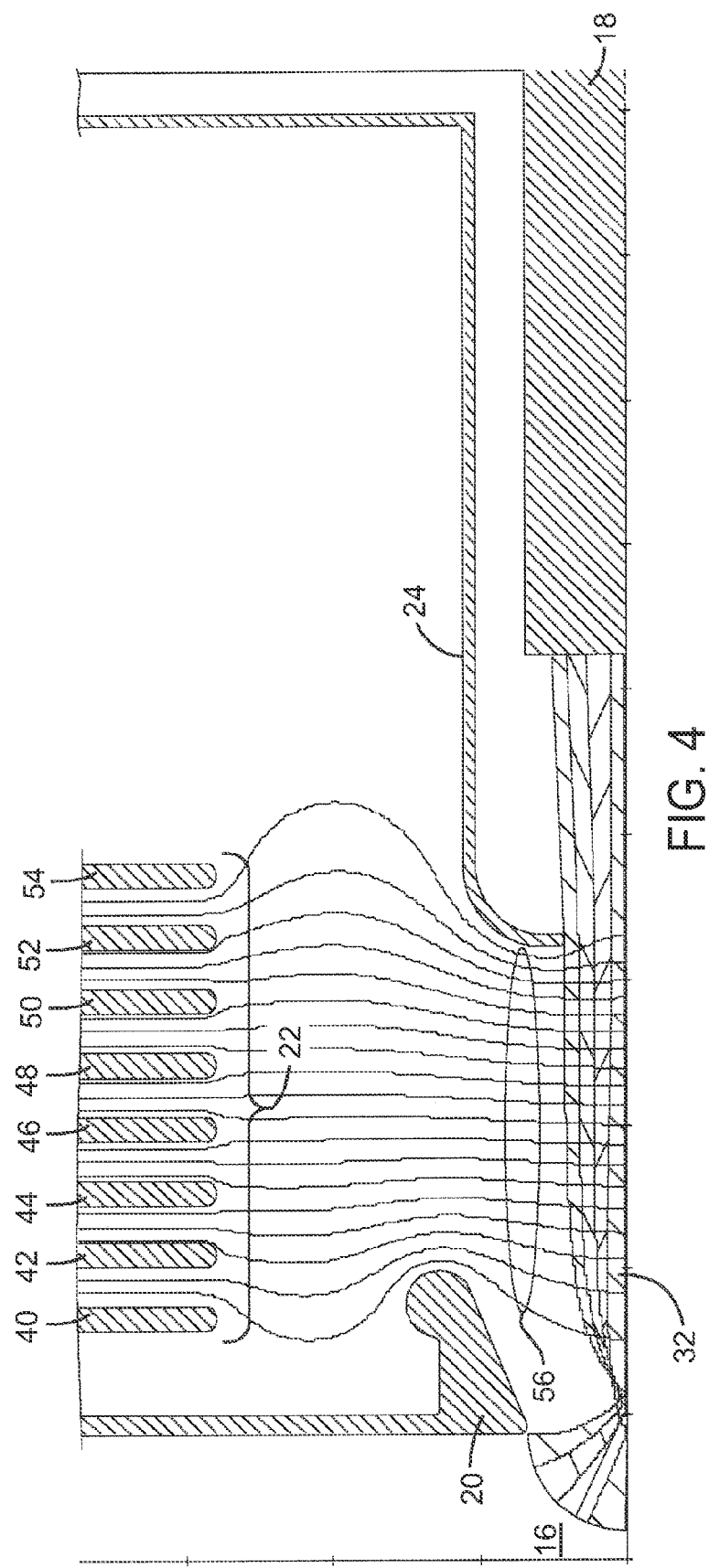
FIG. 4 is a schematic cross-sectional view of the electric potential distribution in the upper half of a neutron generator tube having an electrode configuration with multiple intermediate electrodes, in accordance with an embodiment.

As described above with reference to FIGS. 2 and 3, the inclusion of the intermediate electrode 22 in the acceleration column 14 of the downhole neutron generator tube 11 may result in a more even distribution 34 of the electrical field. Similarly, because multiple intermediate electrodes 22 may more evenly distribute the electrical field, FIG. 4 illustrates another electrode configuration for the neutron generator tube 11 having multiple intermediate electrodes 40-54 in place of a single intermediate electrode 22. In particular, FIG. 4 illustrates a simulated electrode configuration with eight intermediate electrodes 22 between the extractor electrode 20 and the suppressor electrode 24. The eight electrodes 40-54 represent the intermediate electrodes 22 between the extractor electrode 20 and the suppressor electrode 24. In the simulation of FIG. 4, the extractor electrode 20 is simulated as having a voltage potential approximately 100 kV higher than the suppressor electrode 24. The intermediate electrodes 22 may have voltage potentials that vary between 100 kV and 0 V higher than the suppressor electrode 24. For example, the electrodes 40-54 may have voltage potentials of approximately 100 kV, 85.7 kV, 71.4 kV, 57.1 kV, 42.9 kV, 28.6 kV, 14.3 kV, and 0 V, respectively, higher than the suppressor electrode 24. The target electrode 18 may have a voltage potential approximately 200 V higher than that of the suppressor electrode 24. When the presently illustrated electrode configuration is employed in the acceleration column of an x-ray generator tube, the applied voltage potentials may be substantially the same.

As a result of the relatively small potential differences between each of the intermediate electrodes 22, the electrical field stresses may be relatively minor. Accordingly, spontaneous electron emission and/or catastrophic leakage events may be particularly unlikely on the electrodes 40-54. Moreover, an electrical field distribution 56 may be approximately even near the location of the ion beam 32. The evenness of the electrical field distribution 56 may decrease the likelihood that the ion beam 32 will strike the suppressor electrode 24, which may correspondingly reduce sputtering events. The evenness of the electrical field distribution 56 also may reduce the likelihood of spontaneous electron emission and/or catastrophic leakage events due to electrical field stresses on the suppressor electrode 24. This improved focusing effect may produce an ion beam 32 that is substantially parallel to the axis of the neutron generator tube 11 and that does not cross over. Such a focused ion beam 32 may further reduce the probability that ions or neutral atoms caused when ions strike the pressurized gas 3 may strike any electrodes other than the target electrode 18.

Figure 5:
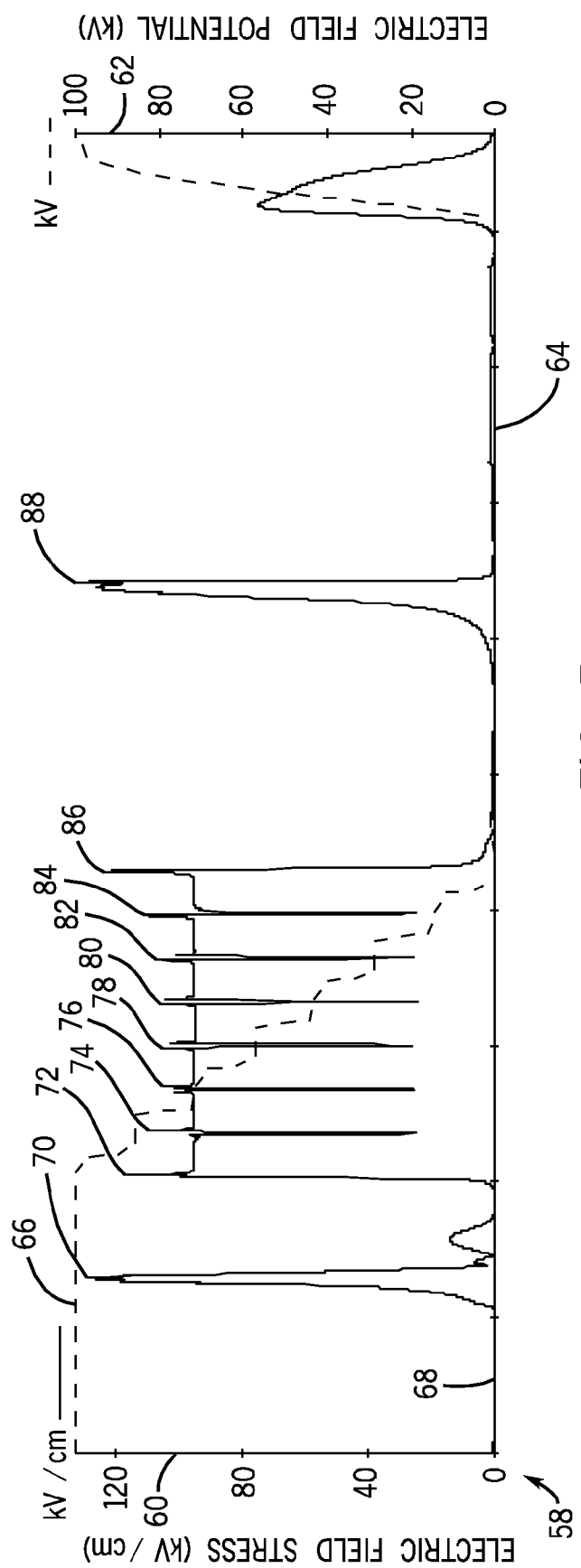
FIG. 5 is a plot describing electrical field stresses on the surfaces of electrodes of the upper half of the neutron generator tube of FIG. 4, in accordance with an embodiment.

FIG. 5 is a plot 58 describing a relationship between electrical field stresses on the surfaces of the electrodes 20, 40-54, and 24 simulated in FIG. 4, and the electrical potential distribution across the length of the electrode configuration of FIG. 4. In the plot 58, a first ordinate 60 represents electrical field stress in units of kV/cm, and a second ordinate 62 represents electrical potential distribution in units of kV. An abscissa 64 represents the relative axial position of the surfaces of the electrode configuration of FIG. 4, extending from behind the extractor electrode 20 on the far left to beyond the target 18 on the far right.

In the plot 58 of FIG. 5, a dashed line represents electrical field potential 66 over the length of the electrode configuration of FIG. 4. As illustrated in the plot 58, rather than drop dramatically between any two electrodes, the electrical potential 66 slowly drops from 100 kV, at a point representing the first electrode 40 of the intermediate electrodes 22, to 0 V, at a point representing the last electrode 54 of the intermediate electrodes 22. A curve 68 represents the electrical field stresses at various points along the electrode configuration of FIG. 4. A peak 70 represents a maximum electrical field stress point on the extractor electrode 20, peaks 72-86 represent maximum electrical field stress point on the electrodes 40-54, respectively, and a peak 88 represents a maximum electrical field stress point on the suppressor electrode 24. As shown in the plot 58, the maximum electrical field stress for the electrode configuration simulated in FIG. 4 remains less than 140 kV/cm, which may be 300 kV/cm less than the maximum electrical field stress for electrode configurations without intermediate electrodes.

Figure 6:
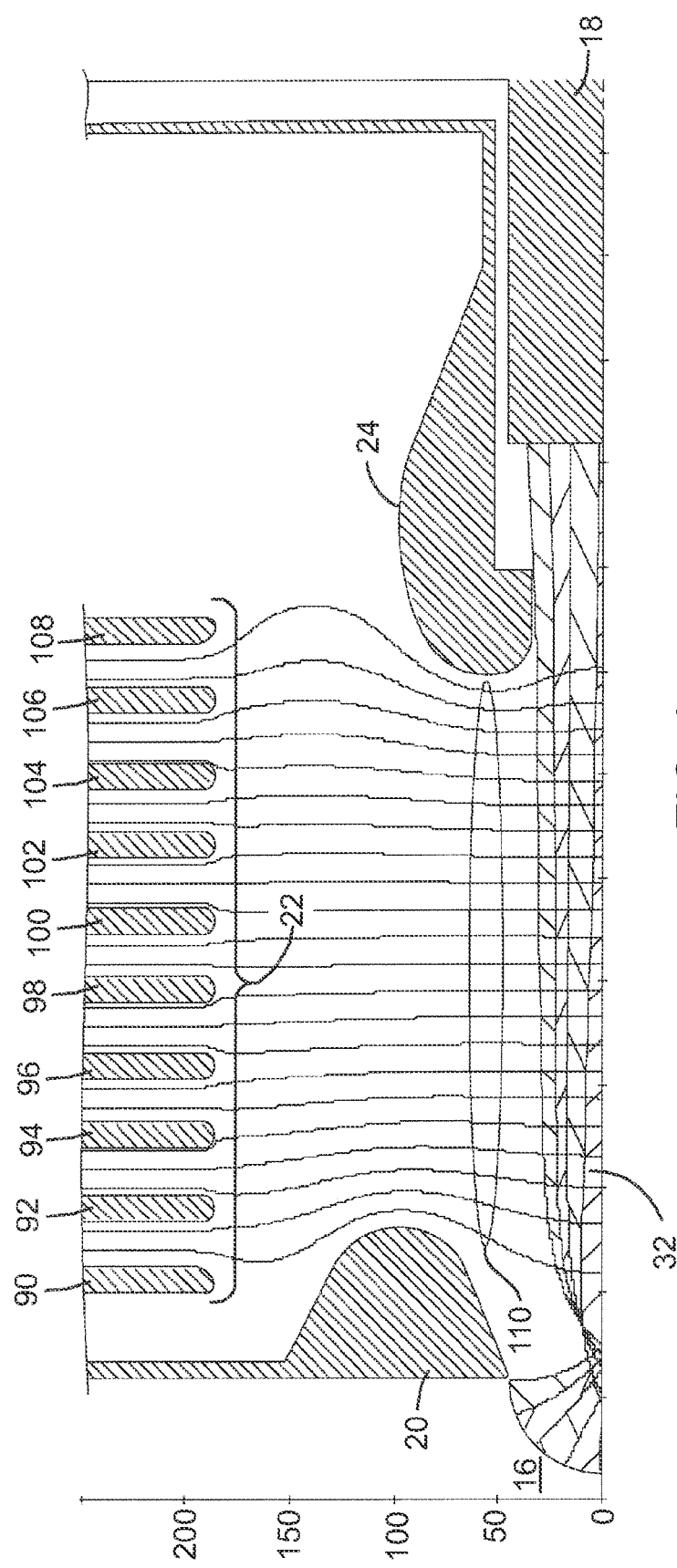
FIG. 6 is a schematic cross-sectional view of the electric potential distribution in the upper half of another neutron generator tube having an electrode configuration with multiple intermediate electrodes, in accordance with an embodiment.

FIG. 6 represents another electrode configuration for the neutron generator tube 11 that includes multiple electrodes 90-108 in place of a single intermediate electrode 22. In particular, FIG. 5 illustrates a simulated electrode configuration with ten intermediate electrodes 22 between the extractor electrode 20 and the suppressor electrode 24. The ten electrodes 90-108 represent the intermediate electrodes 22 between the extractor electrode 20 and the suppressor electrode 24. In the simulation of FIG. 5, the extractor electrode 20 is simulated as having a voltage potential 100 kV higher than the suppressor electrode 24 and as having an extruding shape to evenly guide the electrical field and to reduce electrical field stresses. The ten intermediate electrodes 90-108 may have voltage potentials that vary between 100 kV and 0 V higher than the suppressor electrode 24. For example, the electrodes 90-108 may have voltage potentials of approximately 100 kV, 88.9 kV, 77.8 kV, 66.7 kV, 55.6 kV, 44.4 kV, 33.3 kV, 22.2 kV, 11.1 kV, and 0 V, respectively, higher than the suppressor electrode 24. The target electrode 18 may have a voltage potential approximately 200 V higher than that of the suppressor electrode 24. The suppressor electrode 24 may also be shaped so as to evenly guide the electrical field and to reduce electrical field stresses. When the presently illustrated electrode configuration is employed in the acceleration column of an x-ray generator tube, the applied voltage potentials may be substantially the same.

As a result of the relatively small potential differences between each of the intermediate electrodes 22, the electrical field stresses may be relatively minor. Accordingly, spontaneous electron emission and/or catastrophic leakage events may be particularly unlikely on the electrodes 90-108. Moreover, an electrical field distribution 110 may be approximately uniform near the location of the ion beam 32. The evenness of the electrical field distribution 110 may decrease the likelihood that the ion beam 32 will strike the suppressor electrode 24, which may correspondingly reduce sputtering events. The evenness of the electrical field distribution 110 also may reduce the likelihood of spontaneous electron emission and/or catastrophic leakage events due to electrical field stresses on the suppressor electrode 24, as may the shape of the suppressor electrode 24. This improved focusing effect may produce an ion beam 32 that is substantially parallel to the axis of the neutron generator tube 11 and that does not cross over. Such a focused ion beam 32 may further reduce the probability that ions or neutral atoms caused when ions strike the pressurized gas 3 may strike any electrodes other than the target electrode 18

Figure 7:
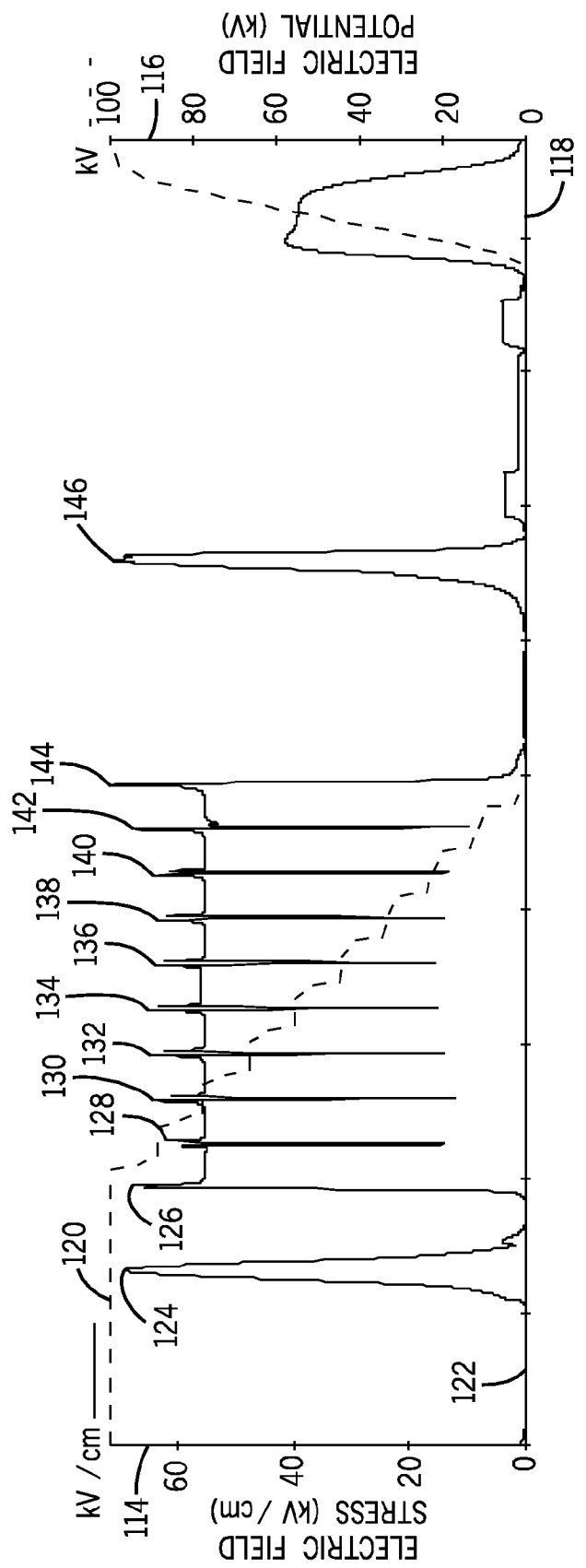
FIG. 7 is a plot describing electrical field stresses on the surfaces of electrodes of the upper half of the neutron generator tube of FIG. 6 at a first voltage potential, in accordance with an embodiment.

FIG. 7 is a plot 112 describing a relationship between electrical field stresses on the surfaces of the electrodes 20, 90-108, and 24 simulated in FIG. 6, and the electrical potential distribution across the length of the electrode configuration of FIG. 6. In the plot 112, a first ordinate 114 represents electrical field stress in units of kV/cm, and a second ordinate 116 represents electrical potential in units of kV. An abscissa 118 represents the relative length of the surfaces of the electrode configuration of FIG. 6, extending from behind the extractor electrode 20 on the far left to beyond the target 18 on the far right.

In the plot 112 of FIG. 7, a dashed line represents the electrical potential 120 over the length of the electrode configuration of FIG. 6. Like the simulation described in the plot 58 of FIG. 4, in the plot 112 of FIG. 7, rather than drop dramatically between any two electrodes, the electrical potential 120 slowly drops from 100 kV, at a point representing the first electrode 90 of the intermediate electrodes 22, to 0 V, at a point representing the last electrode 108 of the intermediate electrodes 22. A curve 122 represents the electrical field stresses at various points along the electrode configuration of FIG. 6. A peak 124 represents a maximum electrical field stress point on the extractor electrode 20, peaks 126-144 represent maximum electrical field stress point on the electrodes 90-108, respectively, and a peak 146 represents a maximum electrical field stress point on the suppressor electrode 24. As shown in the plot 112, the maximum electrical field stress for the electrode configuration simulated in FIG. 5 remains less than 80 kV/cm.

Figure 8:
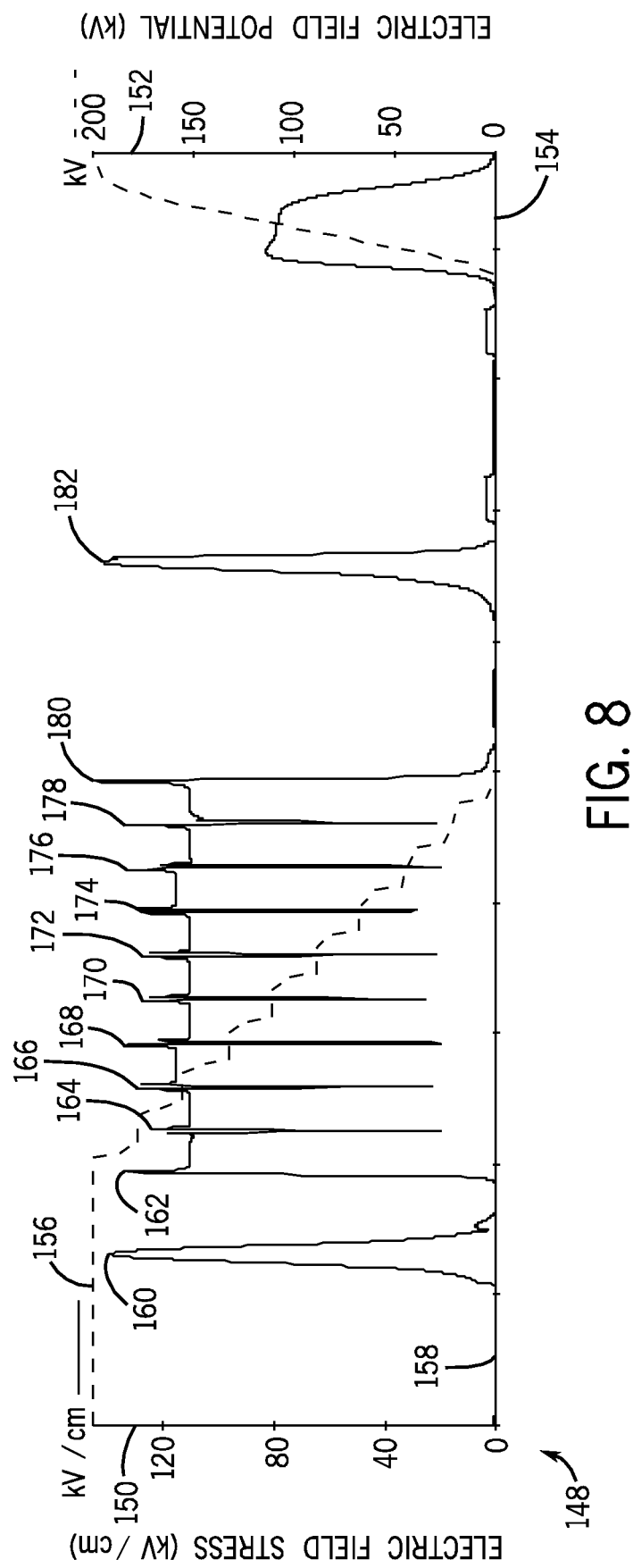
FIG. 8 is a plot describing electrical field stresses on the surfaces of electrodes of the upper half of the neutron generator tube of FIG. 6 at a second voltage potential, in accordance with an embodiment.

Because the electrode configuration of FIG. 6 may further reduce electrical field stresses, the electrode configuration of FIG. 6 may be adapted for higher voltage potentials. For example, FIG. 8 is a plot 148 describing a relationship between electrical field stresses on the surfaces of the electrodes 20, 90-108, and 24 simulated in FIG. 6 and the electrical potential distribution across the length of the electrode configuration of FIG. 6, when the voltage potentials of the extractor electrode 20 and the intermediate electrodes 22 are doubled. Thus, the extractor electrode 20 may have a voltage potential of approximately 200 kV greater than that of the suppressor electrode 24, and the ten intermediate electrodes 90-108 may have voltage potentials that vary between approximately 200 kV and 0 V higher than the suppressor electrode 24. For example, the electrodes 90-108 may have voltage potentials of approximately 200 kV, 177.8 kV, 155.6 kV, 133.3 kV, 111.1 kV, 88.9 kV, 66.7 kV, 44.4 kV, 22.2 kV, and 0 V, respectively, higher than the suppressor electrode 24. The target electrode 18 may continue to have a voltage potential approximately 200 V higher than that of the suppressor electrode 24. When the presently illustrated electrode configuration is employed in the acceleration column of an x-ray generator tube, the applied voltage potentials may be substantially the same.

In the plot 148 of FIG. 8, a first ordinate 150 represents electrical field stress in units of kV/cm, and a second ordinate 152 represents electrical potential distribution in units of kV. An abscissa 154 represents the relative length of the surfaces of the electrode configuration of FIG. 6, extending from behind the extractor electrode 20 on the far left to beyond the target 18 on the far right. In the plot 148 of FIG. 8, a dashed line represents the electrical potential distribution 156 over the length of the electrode configuration of FIG. 6. Like the simulation described in the plot 112 of FIG. 7, in the plot 148 of FIG. 8, rather than drop dramatically between any two electrodes, the electrical potential 156 slowly drops from 200 kV, at a point representing the first electrode 90 of the intermediate electrodes 22, to 0 V, at a point representing the last electrode 108 of the intermediate electrodes 22. A curve 158 represents the electrical field stresses at various points along the electrode configuration of FIG. 6. A peak 160 in the curve 158 represents a maximum electrical field stress point on the extractor electrode 20, peaks 162-182 represent maximum electrical field stress point on the electrodes 90-108, respectively, and a peak 184 represents a maximum electrical field stress point on the suppressor electrode 24. As shown in the plot 148, the maximum electrical field stress for the electrode configuration simulated in FIG. 6 remains less than 140 kV/cm, even though the voltage potential from the extractor electrode 20 to the suppressor electrode 24 is approximately 200 kV.

Figure 9:
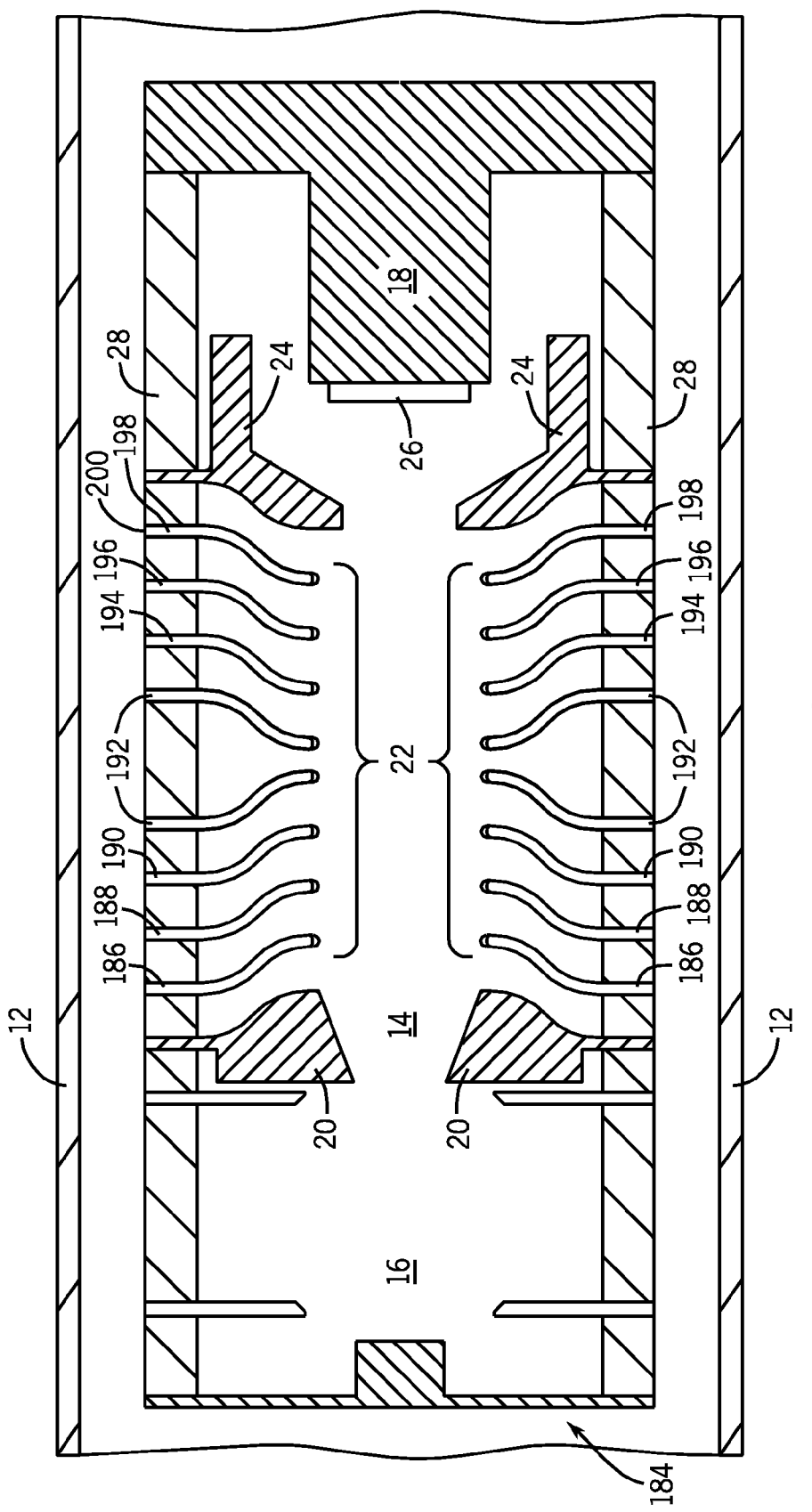
FIG. 9 is a schematic cross-sectional view of a neutron generator tube having eight intermediate electrodes arranged in an efficient pattern, in accordance with an embodiment.

FIG. 9 is a cross-sectional view of a portion of a neutron generator tube 184 having eight intermediate electrodes 22 arranged in an efficient pattern for guiding the electrical field across the acceleration column 14. Like the neutron generator tube 11, the neutron generator tube 184 may be located within a generator housing 12, and an ion source 16 may provide ions for acceleration through the acceleration column 14 to the target 18. In the neutron generator tube 184, the extractor electrode 20 is shaped to further reduce a likelihood that ions from the ion source 16 will strike any of the intermediate electrodes 22 or the suppressor electrode 24. Electrodes 186-198 represent intermediate electrodes 22, of which electrode 192 forms two intermediate electrodes of the same voltage potential. A ceramic insulator 28 separates the outer intermediate electrodes from 186-192 and 192-198. The ceramic insulator 28 is not necessary between the two electrodes 192, as the electrodes 192 both share the same voltage potential.

Each of the intermediate electrodes 22 may be curved inwardly in acceleration column 14. The curvature of the intermediate electrodes 22 may be calculated to guide the electric field through the acceleration column 14 so as to evenly distribute the electrical field. Due to the number and shape of the intermediate electrodes 22 in the neutron generator tube 184, the acceleration column 14 may be extended to a greater length than that of the neutron generator tube 10 or of similar neutron generator tubes with fewer electrodes. This extended acceleration column 14 may enable the ions from the ion source 16 to reach higher energy levels before reaching the target 18. At higher energy levels, the target 18 may generate a greater number of neutrons.

The electrodes 20, 22, and 24 may be shaped for reduced electrical field stresses. In particular, the intermediate electrodes 22 may be shaped to maintain an approximately equal spacing between adjacent electrodes, including the extractor electrode 20 and the suppressor electrode 24. Further, tips 200 of all electrodes of the neutron generator tube 184 may be shaped to minimize a quantity of electrical field stresses that may occur outside of the acceleration column 14 but within the generator housing 12. Additionally, the intermediate electrodes 22 may generally curve toward the radial center of the acceleration column 14. The suppressor electrode 24 may also be shaped to guide the ions from the ion source 16 to the target 18 without excessive sputtering events. To the extent that any ions from the ion source 16 strike the suppressor electrode 24, the array of intermediate electrodes 22, aligned pervasively across the length of the acceleration column 14, may prevent any sputtered electrode material from being deposited on the insulator 28.

Figure 10:
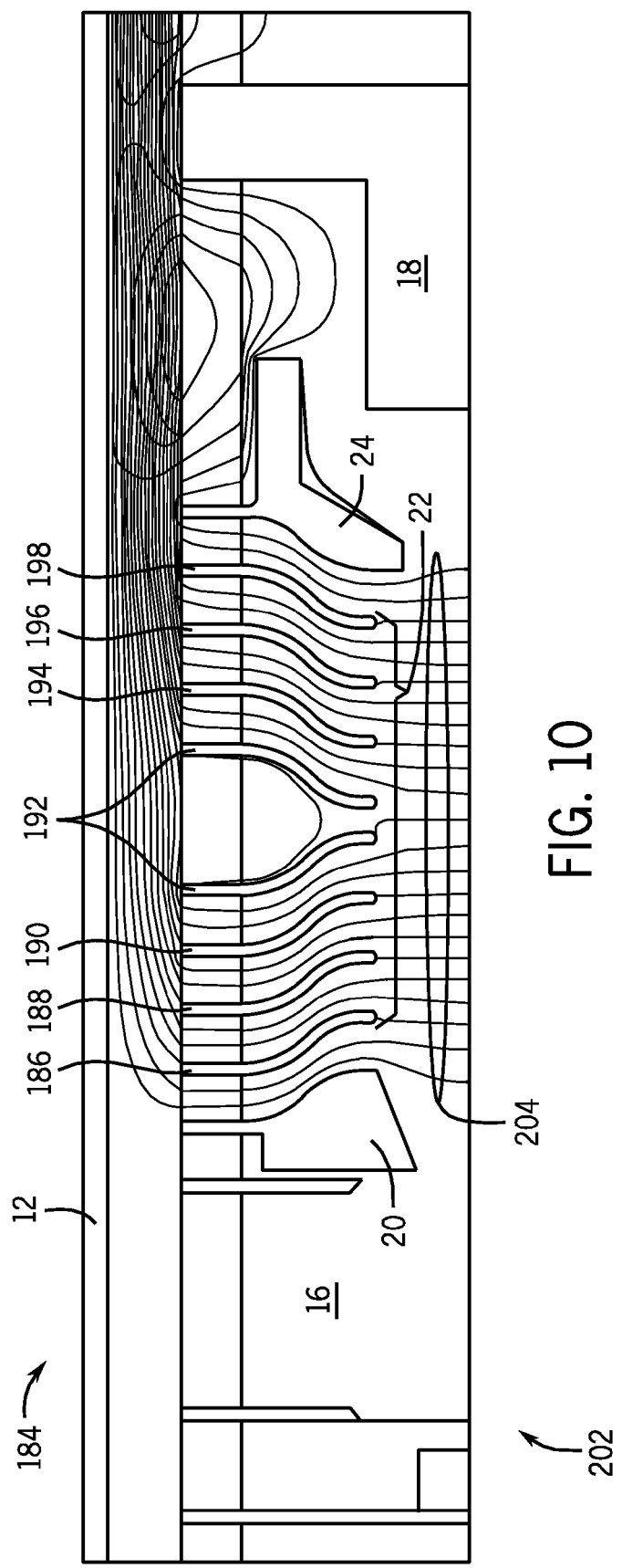
FIG. 10 is a schematic cross-sectional view of the electric potential distribution in the upper half of the neutron generator tube having an electrode configuration with multiple intermediate electrodes, in accordance with the embodiment of FIG. 9.

The plot 202 in FIG. 10 illustrates a simulated electrical potential distribution 204 obtained for the electrode configuration of the neutron generator tube 184 of FIG. 9. The eight intermediate electrodes 186-198 represent the intermediate electrodes 22 between the extractor electrode 20 and the suppressor electrode 24. In the simulation of FIG. 10, the extractor electrode 20 is simulated as having a voltage potential 100 kV higher than the suppressor electrode 24 and as having an extruding shape to evenly guide the electrical field and to reduce electrical field stresses. The eight intermediate electrodes 186-198 may have voltage potentials that vary between 100 kV and 0 V higher than the suppressor electrode 24. For example, the electrodes 186-198 may have voltage potentials of approximately 87.5 kV, 75 kV, 62.5 kV, 50 kV, 37.5 kV, 25 kV, and 12.5 kV, respectively, higher than the suppressor electrode 24. The target electrode 18 may have a voltage potential approximately 200 V higher than that of the suppressor electrode 24. The suppressor electrode 24 may also be shaped so as to evenly guide the electrical field and to reduce electrical field stresses. When the presently illustrated electrode configuration is employed in the acceleration column of an x-ray generator tube, the applied voltage potentials may be substantially the same.

In a manner similar to the simulations described above, the relatively small potential differences between each of the intermediate electrodes 22 may cause the electrical field stresses to be relatively minor. Accordingly, spontaneous electron emission and/or catastrophic leakage events may be particularly unlikely on the electrodes 186-198. Moreover, an electrical potential distribution 204 may be approximately uniform near center of the acceleration column 14, where the ion beam 32 would generally travel. The evenness of the electrical potential distribution 204 may decrease the likelihood that the ion beam 32 will strike the suppressor electrode 24 or the intermediate electrodes 186-198, which may correspondingly reduce sputtering events. The evenness of the electrical potential distribution 204 also may reduce the likelihood of spontaneous electron emission and/or catastrophic leakage events due to electrical field stresses on the suppressor electrode 24, as may the shape of the suppressor electrode 24. This improved focusing effect may produce an ion beam 32 that is substantially parallel to the axis of the neutron generator tube 184 and that does not cross over. Such a focused ion beam 32 may further reduce the probability that ions or neutral atoms caused when ions strike the pressurized gas 3 may strike any electrodes other than the target electrode 18.

Figure 11:
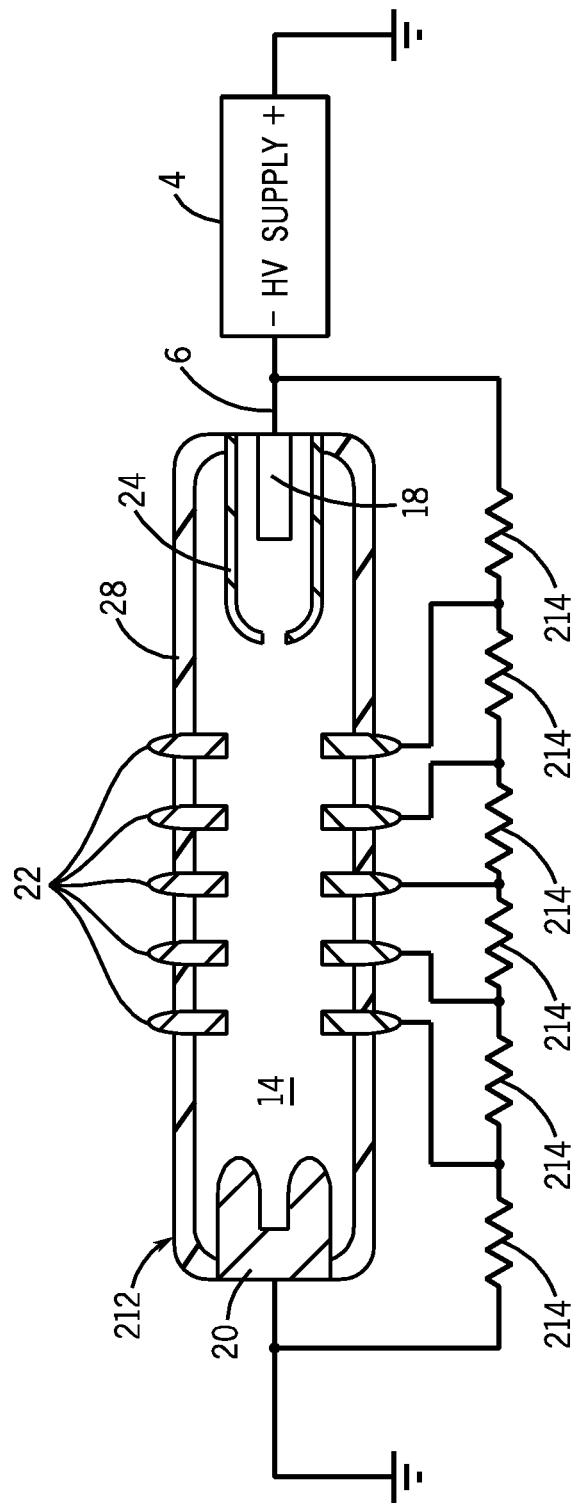
FIG. 11 is a block diagram of a high potential neutron generator employing one high voltage power supply, in accordance with an embodiment.

FIG. 11 illustrates an additional consideration for a neutron generator employing a neutron generator tube 214, which may generally represent the neutron generator tubes 11 and 184 above having one or more intermediate electrodes 22. In order to ensure the proper voltage potentials on the different electrodes 20, 22, and 24, the electrodes may be connected to the correct voltages as delivered by the high voltage generator 4. This may be accomplished either through the use of multiple high voltage generators 4 and/or by the tapping of different voltages from the single high voltage generator 4. However, such an approach may require bringing additional high voltages to the electrodes 20, 22, and 24, and may pose problems due to the limited available space.

The proper voltage potentials on the electrodes 20, 22, and 24 also may be provided by a voltage divider that causes the appropriate high voltages to appear on each of the electrodes. Such a voltage divider may include various resistive elements 214, as shown in FIG. 11, which may be discrete resistors and/or a resistive coating on the outer edge of the insulator 28. The extractor electrode 20 may be connected to ground, and the suppressor electrode 24 may be connected to a negative high voltage potential via the negative high voltage line 6. The resistive divider provided by the various resistive elements 214 may ensure the proper voltage distribution to the intermediate electrodes 22. As should be appreciated, the resistances provided by the resistive elements 214 may vary depending on design considerations and the voltage potentials to be applied to the various intermediate electrodes 22.

Figure 12:
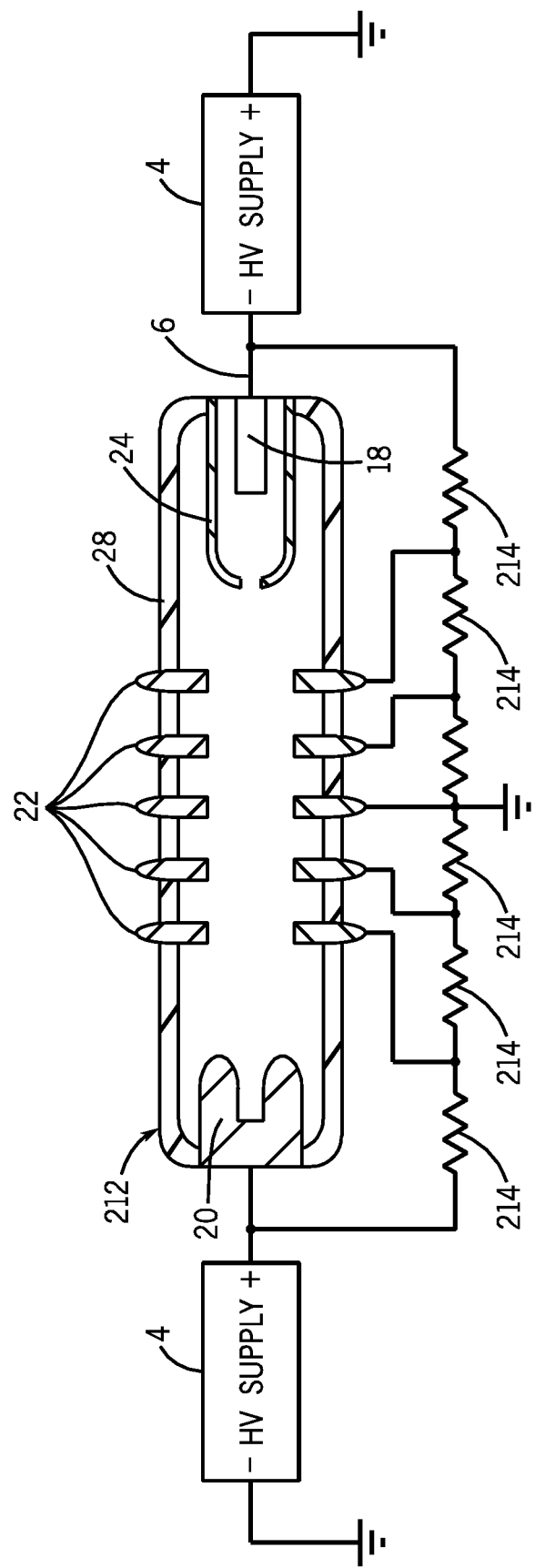
FIG. 12 is a block diagram of a high potential neutron generator employing two high voltage power supplies, in accordance with an embodiment.

Using the improved electrode configurations disclosed above, a downhole neutron generator or x-ray generator may employ a greater voltage potential across the acceleration column 14 from the extractor electrode 20 to the suppressor electrode 24. Accordingly, FIG. 12 illustrates an embodiment of a neutron generator configured to supply approximately double the voltage potential of existing downhole neutron generators. As shown in FIG. 12, a high potential neutron generator tube 216 may receiver high voltage power from two high voltage power supplies 4, electrically connected to the extractor electrode 20 and the suppressor electrode 24, respectively. Specifically, a positive output of the first high voltage power supply 4 may be coupled to the extractor electrode 20, while a negative output may be coupled to ground, effectively supplying a nominal voltage potential of approximately +100 kV to the extractor electrode 20. Meanwhile, a negative output of the second high voltage power supply 4 may be coupled to the suppressor electrode 24, while a positive output may be coupled to ground, effectively supplying a nominal voltage potential of approximately −100 kV to the suppressor electrode 24. In this way, a total accelerating voltage of 200 kV may be supplied while the high voltage with respect to ground, and accordingly the pressure housing 12, may not exceed 100 kV. In some embodiments, the two high voltages may not be symmetrical. For example, one high voltage generator 4 may supply approximately −120 kV and the other high voltage generator 4 may supply approximately +80 kV to provide a total voltage of approximately 200 kV.

The extractor electrode 20 may be electrically separated from one or more intermediate electrodes 22, by one or more resistive elements 214. The resistive elements 214 may include, for example, discrete resistors or a resistive coating on the exterior of the acceleration column 14, which may connect the outer tips of the electrodes and may divide the voltage between the extractor electrode 20 and the suppressor electrode 24. One of the one or more intermediate electrodes 22 may or may not be coupled to ground. The suppressor electrode 24 may be similarly electrically separated from the one or more intermediate electrodes 22 by one or more resistive elements 214.

If the neutron generator tube 212 instead included only a single intermediate electrode 22, which may be tied to ground, the single intermediate electrode 22 may be maintained at a predetermined potential with respect to the other electrodes. Under such conditions, a resistive voltage divider may not be employed, but rather an electrode tied to ground may facilitate the task of securing the neutron generator tube 212 mechanically to the pressure housing 12, which, as illustrated above with reference to FIG. 1, may surround a neutron generator tube such as the neutron generator tube 212. This alternative arrangement may more easily survive the rough handling often encountered by downhole tools, and may also help with the evacuation of heat from the neutron generator tube 11. If such a single intermediate electrode 22 were not tied to a predetermined potential provided by a high voltage power supply 4, one or more resistive voltage dividers 214 may be employed to ensure the proper electric potentials for the electrode 22.

Figure 13:
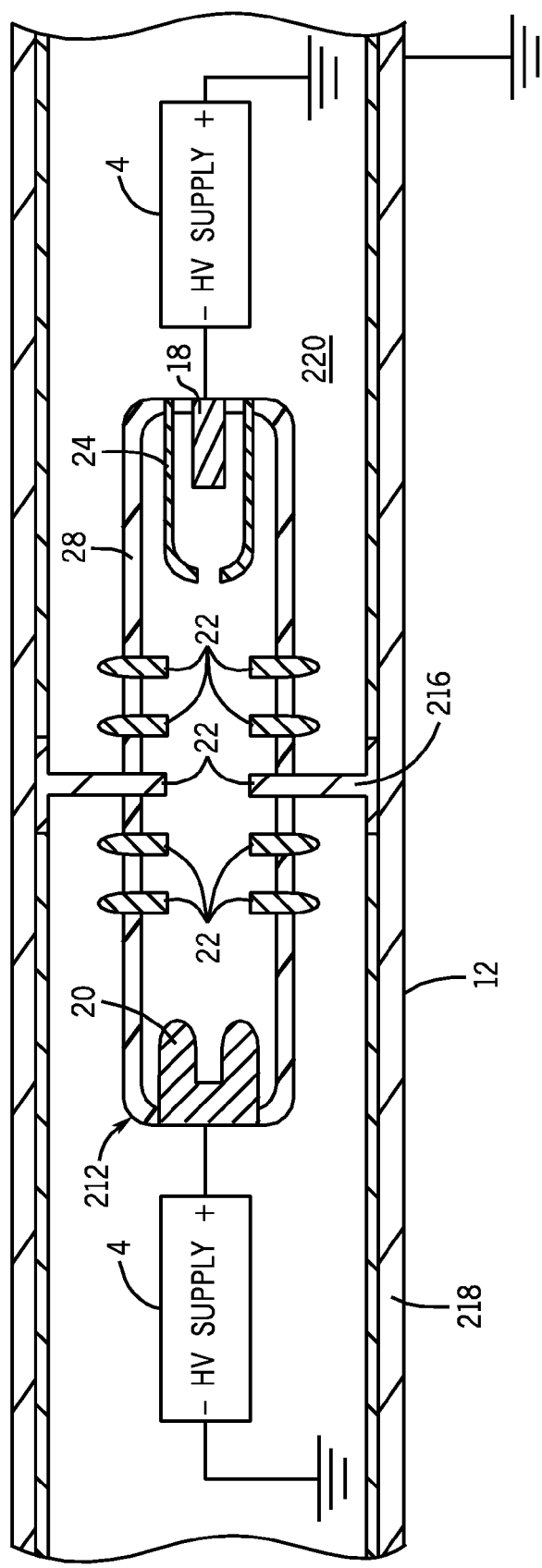
FIG. 13 is a schematic diagram of the neutron generator shown in FIG. 12 indicating the mechanical support of a grounded intermediate electrode.

FIG. 13 represents a configuration of the neutron generator tube 212 having a grounded mechanical support 216 coupled to one of the intermediate electrodes 22. As illustrated, the extractor electrode 20 may be separated from the suppressor electrode 24 by the several intermediate electrodes 22. The neutron generator tube 212 may be contained within a pressure housing 12 that includes an insulating sleeve 218. An insulating gas 220 may fill the spaces surrounding the neutron generator tube 212, and may be the same as the insulating gas 3 described above with reference to FIG. 1.

A grounded support 216 on one of the intermediate electrodes 22 may improve the mechanical ruggedness of the neutron generator tube 212 and may also improve heat evacuation. In the embodiment of FIG. 13, the center intermediate electrode 22 is coupled to the grounded support 216. Additionally or alternatively, the grounded support 216 may be coupled to any of the intermediate electrodes 22. The configuration illustrated in FIG. 13 may be particularly advantageous if the positive and negative high voltages from the high voltage supplies 4 are not symmetrical to ground. Under such conditions, the present configuration may ensure that the supported intermediate electrode 22 always remains at ground regardless of the potentials supplied by the high voltage power supplies 4.

While only certain features have been illustrated and described herein, many modifications and changes will occur to those skilled in the art. It is, therefore, to be understood that the appended claims are intended to cover all such modifications and changes as fall within the true spirit of the present disclosure.

What is claimed is:

1. A nuclear radiation generator capable of downhole operation comprising:
   a charged particle source;
   a target material configured to generate nuclear radiation when struck by charged particles from the charged particle source; and
   an acceleration column between the charged particle source and the target material, having a longitudinal axis and an insulator surface, that includes a plurality of electrodes configured to draw a beam of the charged particles from the charged particle source to strike the target material, the plurality of electrodes comprising an extractor electrode, a suppressor electrode, and an intermediate electrode between the extractor electrode and the suppressor electrode;
   wherein each of the extractor electrode, suppressor electrode, and intermediate electrode comprising a first end coupled to the insulator surface, a second end extending toward the longitudinal axis of the acceleration column, and an intermediate portion between the first end and the second end;
   a distance between the second end of the extractor electrode and the second end of the intermediate electrode being equal to a distance between the second end of the intermediate electrode and the second end of the suppressor electrode.

2. The nuclear radiation generator of claim 1, wherein the charged particle source comprises a cathode configured to emit electrons and the target material comprises an anode configured to emit x-rays when struck by electrons from the cathode.

3. The nuclear radiation generator of claim 1, wherein the charged particle source comprises an ion source configured to emit ions and the target material comprises a target electrode configured to emit neutrons when struck by ions from the ion source.

4. A neutron generator capable of downhole operation comprising:
   an ion source;
   a target electrode; and
   an acceleration column between the ion source and the target electrode, said acceleration column having a longitudinal axis and an insulator surface, wherein the acceleration column includes a plurality of electrodes configured to draw ions from the ion source toward the target electrode, the plurality of electrodes comprising an extractor electrode, a suppressor electrode, and an intermediate electrode between the extractor electrode and the suppressor electrode;
   wherein each of the extractor electrode, suppressor electrode, and intermediate electrode comprising a first end coupled to the insulator surface, a second end extending toward the longitudinal axis of the acceleration column, and an intermediate portion between the first end and the second end;
   a distance between the second end of the extractor electrode and the second end of the intermediate electrode being equal to a distance between the second end of the intermediate electrode and the second end of the suppressor electrode.

5. The neutron generator of claim 4, wherein the plurality of electrodes includes an extractor electrode, a suppressor electrode, and a plurality of intermediate electrodes between the extractor electrode and the suppressor electrode.

6. The neutron generator of claim 4, wherein the plurality of electrodes is configured such that electrical field stresses on any of the plurality of electrodes are less than approximately 250 kV/cm when a voltage potential applied across the plurality of electrodes is greater than or equal to approximately 100 kV.

7. The neutron generator of claim 4, wherein the neutron generator is configured to apply a voltage potential across the plurality of electrodes of greater than or equal to approximately 100 kV during operation.

8. The neutron generator of claim 4, wherein the neutron generator is configured to apply a voltage potential across the plurality of electrodes of greater than or equal to approximately 150 kV during operation.

9. The neutron generator of claim 4, wherein the acceleration column is maintained at a pressure during operation.

10. A neutron generator capable of downhole operation comprising:
    an ion source;
    a target electrode; and an acceleration column having a longitudinal axis and an insulator surface and disposed between the ion source and the target electrode, comprising:
an extractor electrode nearer to the ion source than the target electrode;
a suppressor electrode nearer to the target electrode than the ion source; and
an intermediate electrode disposed between the extractor electrode and the suppressor electrode;
wherein each of the extractor electrode, suppressor electrode, and intermediate electrode comprising a first end coupled to the insulator surface, a second end extending toward a longitudinal axis of the acceleration column, and an intermediate portion between the first end and the second end;
a distance between the second end of the extractor electrode and the second end of the intermediate electrode being equal to a distance between the second end of the intermediate electrode and the second end of the suppressor electrode, the second end of the intermediate electrode being curved inwardly toward, but not crossing, the longitudinal axis of the acceleration column.

11. The neutron generator of claim 10, wherein the extractor electrode is configured to guide ions from the ion source toward the target electrode without striking the suppressor electrode under downhole operation.

12. The neutron generator of claim 10, wherein the extractor electrode, the intermediate electrode, and the suppressor electrode are electrically separated from one another by the insulator forming the insulator surface, wherein the insulator is a high voltage insulator configured to insulate voltages of 50 kV, and wherein the intermediate electrode is disposed in the high voltage insulator approximately midway between a point at which the extractor electrode is disposed in the high voltage insulator and a point at which the suppressor electrode is disposed in the high voltage insulator.

13. The neutron generator of claim 10, wherein the extractor electrode, the intermediate electrode, and the suppressor electrode extend into the acceleration column through a high voltage insulator configured to insulate voltages of 50 kV, wherein the intermediate electrode is disposed in the high voltage insulator farther from the ion source than a second end of the suppressor electrode.

14. The neutron generator of claim 10, wherein the intermediate electrode has a voltage potential approximately midway between a voltage potential of the extractor electrode and a voltage potential of the suppressor electrode.

15. The neutron generator of claim 10, wherein the intermediate electrode is one of a plurality of intermediate electrodes disposed between the extractor electrode and the suppressor electrode.

16. The neutron generator of claim 15, wherein at least one of the plurality of intermediate electrodes has a voltage potential between a voltage potential of the extractor electrode and a voltage potential of the suppressor electrode.

17. A neutron generator capable of downhole operation, comprising:
an ion source;
a target electrode; and
an acceleration column having a longitudinal axis and an insulator surface and disposed between the ion source and the target electrode;
wherein the acceleration column comprises at least three electrodes disposed between the ion source and the target electrode, a first of the at least three electrodes being adjacent to a second of the at least three electrodes, and the second of the at least three electrodes being adjacent to a third of the at least three electrodes;
wherein the at least three electrodes include an extractor electrode and a suppressor electrode;
wherein each electrode of the at least three electrodes comprises a first end coupled to the insulator surface, a second end extending toward the longitudinal axis of the acceleration column, and an intermediate portion between the first end and the second end;
wherein a distance between the second ends of each adjacent electrode of the at least three electrodes is equal to each other;
wherein the second end of at least one electrode of the at least three electrodes is curved inwardly toward, but not crossing, the longitudinal axis of the acceleration column; and
wherein the neutron generator is configured to apply a voltage potential between one of the at least three electrodes and another of the at least three electrodes of greater than approximately 100 kV during operation.

18. The neutron generator of claim 17, wherein the neutron generator is configured to apply a voltage potential between one electrode of the at least three electrodes and another electrode of the at least three electrodes of greater than approximately 150 kV during operation.

19. The neutron generator of claim 17, comprising two high voltage power supplies coupled respectively one electrode of the at least three electrodes and another electrode of the at least three electrodes, and wherein the two high voltage power supplies are configured to supply the voltage potential during the operation.

20. The neutron generator of claim 17, wherein the at least three electrodes comprises an intermediate electrode, wherein the intermediate electrode is connected to ground.

21. The neutron generator of claim 20, comprising a pressure housing and a vacuum envelope, wherein the pressure housing surrounds the vacuum envelope and wherein the vacuum envelope surrounds the ion source, the target electrode, and the acceleration column, and wherein the intermediate electrode is configured to mechanically secure the vacuum envelope to the pressure housing.

22. The neutron generator of claim 17, wherein the at least three electrodes are configured to keep a maximum electrical field stress on the at least three electrodes less than or equal to approximately 140 kV/cm during operation.

* * * * *